Figures 1, 2, 3, 4:
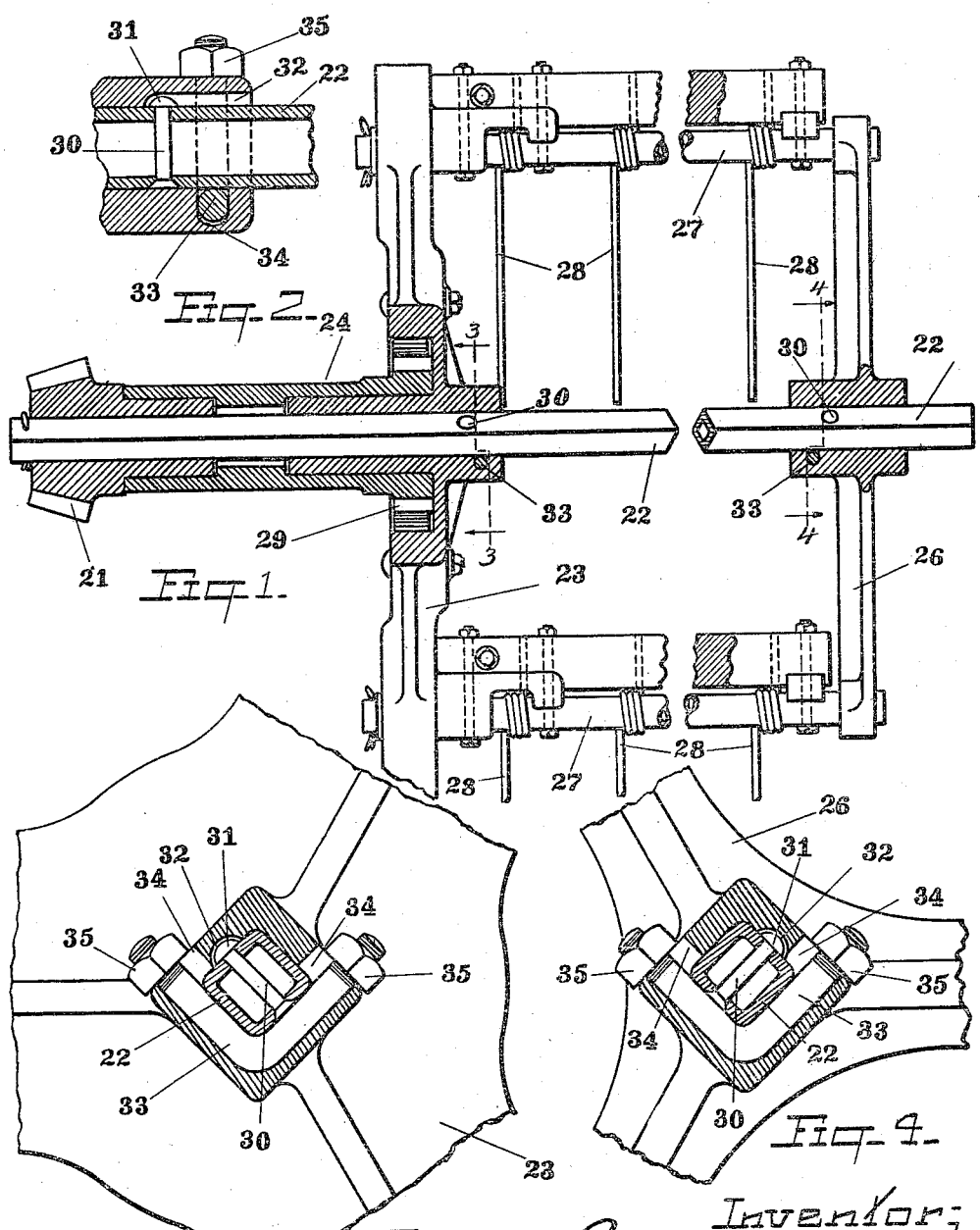

R. R. BOWERS.
KEYING DEVICE.
APPLICATION FILED NOV. 6, 1916.

1,272,200.

Patented July 9, 1918.

Witness;
Erich G. Erichson.

Inventor;
Robert R. Bowers
by Adams & Jackson
Attorneys.

UNITED STATES PATENT OFFICE.

ROBERT R. BOWERS, OF OTTUMWA, IOWA, ASSIGNOR TO THE DAIN MANUFACTURING COMPANY OF IOWA, OF OTTUMWA, IOWA, A CORPORATION OF IOWA.

KEYING DEVICE.

1,272,200.

Specification of Letters Patent.

Patented July 9, 1918.

Application filed November 6, 1916. Serial No. 129,856.

*To all whom it may concern:*

Be it known that I, ROBERT R. BOWERS, a citizen of the United States, and a resident of Ottumwa, in the county of Wapello and State of Iowa, have invented certain new and useful Improvements in Keying Devices, of which the following is a specification, reference being had to the accompanying drawings.

This invention relates to improvements in keying devices having a special value in connection with the securing of reel-heads on side-delivery rakes of the general type shown in the Letters Patent to Joseph Dain, No. 886,681, dated May 5, 1908, wherein is embodied a rotary reel arranged at an angle to the line of draft and comprising two heads secured near opposite ends of a central shaft that is suitably journaled in a frame, the said heads being connected together by teeth-carrying bars. The description of the invention will, therefore, be made by reference to such a structure. Such rakes are ordinarily sent out from the factory in a dismantled or knocked-down condition and frequently are sent by the dealer to the purchasing farmer in like condition. Now it is essential for the best results when the reel-heads are secured in place upon the said central shaft that the sockets or supports intended for the ends of each tooth-bar shall be directly opposite each other, whereby each of such bars will be in substantial parallelism with the shaft. Frequently, however, the farmer, who is not experienced in assembling machines, will fail to so secure the two heads in place in the proper way, due to the fact that the said central shaft is usually square in cross-section and the reel-heads are of the three-armed construction, as shown in the said Dain patent. By reason of this construction it is an easy matter for the heads to be so put on that the tooth-bars will not extend properly between them, as the sockets or bearings in the two heads will not be in alinement or directly opposite each other. When the bars are improperly put on, it follows that their arrangement causes an undue strain upon them when the reel revolves, with the result that the machine does not work to the best advantage and does not endure as long as should be the case. It is the object of my invention to so construct the reel-heads and the shaft to which they are attached that it will not be possible to connect these parts together in any other than the proper manner; and it is a further object to provide improved and simple securing means for tightly clamping the heads to the shaft after such heads have been properly placed in position on the shaft. These objects I attain by the means shown in the drawings and hereinafter particularly described. That which I believe to be new will be set forth in the claims.

In the drawings,—

Figure 1 is a view in rear elevation of the rotary reel and its shaft, the central parts thereof being broken away, and showing in longitudinal section the hub portion of each head and certain driving and supporting parts connected with one of the heads;

Fig. 2 is a detail in longitudinal section through the reel-shaft and the hub of one of the heads, showing my improvements in connection therewith; and Figs. 3 and 4 are transverse sections taken at lines 3—3 and 4—4, respectively, of Fig. 1.

Referring to the several figures of the drawings, in which corresponding parts are indicated by the same reference characters:—

21 indicates a beveled gear that is suitably secured upon the forward end of a shaft 22 which, as shown, is square in cross-section. Such shaft extends across the reel-frame from end to end, and is supported and driven in any suitable manner, preferably as shown in said Dain patent. Near its forward end it has secured to it, in the manner hereinafter described, the forward reel-head 23. Upon the extended hubs of such forward reel-head and the beveled pinion 21 is mounted a sleeve 24 supported from the axle of the rake in any usual manner, the extended portions of the hubs of the said forward reel-head and pinion forming the bearing for the forward end of the shaft. The reel that has been referred to comprises the head 23 already mentioned, another head 26 adjacent to the rear end of the supporting frame, and a plurality of teeth-carrying bars 27—three in number, in the construction here shown—extending between and suitably connected to the heads. The wire rake-teeth carried by these bars 27 are indicated by 28. Each reel-head is shown (see Figs. 3 and 4) as formed to provide three arm-like portions, and against the outer face of each arm of the inner head 23 will be secured two gears in the manner described in the said Dain Patent No. 886,681 and well understood by those acquainted with this art, the outer one of each of the gears being made fast to one end of a tooth-bar 27. In mesh with the inner one of each of these three sets of gears is a gear 29 which is fast on, and preferably formed integral with, the sleeve 24.

To insure each reel-head being always placed upon the shaft 22 so that the proper bearings for each tooth-bar are opposite each other, the shaft and the hub of each reel-head are formed so that one of such parts has a projection and the other part a recess to receive such projection,—thereby rendering it impossible to put a reel-head on the shaft in any other position than one that will cause the projection to enter such recess. In the construction shown, the projection is upon the shaft and is formed by passing a rivet through alined holes drilled in the walls of the hollow shaft, the hole in one wall being countersunk to receive the rivet's head and then heading over the projecting end of the rivet. The rivet is indicated by 30 and the head end thereof that forms the operative projection for engaging the recess is indicated by 31. The recess in the inner face of each reel-head hub is indicated by 32. For securely clamping the reel-head to the shaft, I employ an L-shaped bolt 33 that lies in a wide similarly-shaped opening 34 formed in the reel-head hub, the bolt lying in contact with two faces of the square shaft 22 and being adapted to be held tightly in place by nuts 35 screwed on the ends thereof. The bolt-opening 34 is made considerably larger than the diameter of the bolt itself in order that the bolt may be inserted or withdrawn.

By my improvements all liability of the reel-heads being improperly placed upon the shaft is effectually overcome, and the said heads when in place are very securely held by means easily accessible and removable.

That which I claim as my invention, and desire to secure by Letters Patent, is:—

1. The combination with a shaft and a member having a hub adapted to fit thereon, said shaft having a rivet extending therethrough and secured therein and having a head projecting from the face of the shaft, the inner face of the hub being recessed to receive said rivet-head, whereby the hub can only be placed on the shaft in a predetermined position.

2. The combination with a shaft of a member having a hub adapted to fit thereon, said shaft having a rivet extending therethrough and secured therein and having a head projecting from the face of the shaft, the inner face of the hub being recessed to receive said rivet-head, whereby the hub can only be placed on the shaft in a predetermined position, and means for binding said shaft and hub closely together.

3. The combination with a shaft, a member having a hub adapted to fit thereon, and means on the shaft and hub for interlocking such parts together, of a bolt passing through the hub and partially surrounding the shaft, and means for tightening the bolt to force the shaft and hub into close frictional contact.

4. The combination with a shaft, a member having a hub adapted to fit thereon, and means on the shaft and hub for interlocking such parts together, of a bent bolt passing through the hub and partially surrounding the shaft, and means for tightening the bolt to force the shaft and hub into close frictional contact, the bolt-hole in the hub being of considerably greater width than the bolt to permit the insertion and withdrawal of such bent bolt.

5. The combination with a shaft having a plurality of faces and a member having a hub adapted to fit thereon and having a recess in one of its faces, of a rivet passed through two faces of the shaft and having an end projecting beyond one of such faces and entering the said recess in the hub, a bent bolt passing through the hub and in contact with two faces of the shaft, and means for tightening the bolt to force said shaft into close frictional engagement, the hub having its bolt-hole enlarged to permit of the insertion and withdrawal of the bolt.

ROBERT R. BOWERS.

Copies of this patent may be obtained for five cents each, by addressing the "Commissioner of Patents, Washington, D. C."